United States Patent [19]

Yamada

[11] 4,180,225

[45] Dec. 25, 1979

[54] INK JET RECORDING APPARATUS

[75] Inventor: Takahiro Yamada, Hitachi, Japan

[73] Assignee: Hitachi, Ltd., Japan

[21] Appl. No.: 857,707

[22] Filed: Dec. 5, 1977

[30] Foreign Application Priority Data

Dec. 6, 1976 [JP] Japan ................................ 51/145576

[51] Int. Cl.$^2$ ............................................ G01D 15/18

[52] U.S. Cl. .................................. 346/75; 346/140 R

[58] Field of Search .............................. 346/75, 140 R

[56] References Cited

U.S. PATENT DOCUMENTS

| | | | |
|---|---|---|---|
| 3,596,275 | 7/1971 | Sweet | 346/75 X |
| 3,786,517 | 1/1974 | Krause | 346/75 |

*Primary Examiner*—George H. Miller, Jr.
*Attorney, Agent, or Firm*—Craig and Antonelli

[57] ABSTRACT

An ink jet recorder has a recording head assembly which has an ink reservoir made of an electrical insulator having an inlet opening for supply of pressurized ink at one end thereof and an outlet opening in the end wall at the other end thereof. An inner electrode is attached to the wall end of the reservoir around the outlet opening within the reservoir. An outer electrode is also fixed to the end wall of the reservoir on the side opposite to the inner electrode and has an orifice aligned with the opening in the reservoir. A vibratory voltage modified by character signals is applied across the inner and outer electrodes.

17 Claims, 8 Drawing Figures

INK JET RECORDING APPARATUS

BACKGROUND OF THE INVENTION

The present invention relates to an ink jet recording apparatus, more particularly to an ink jet recorder having a recording head assembly using an ion drag pump system.

Usually, in the conventional ink jet recording apparatus, ink under pressure is ejected through an orifice to form an ink stream which ultimately breaks up into droplets. The ink droplets are formed by the periodic separation of the foremost portion of the ink stream which is ejected from the orifice. The ink droplets travel along a path toward a recording medium and are subjected to an electrostatic field to be deflected thereby in a selective manner. Thereby, only the ink droplets necessary for recording reach the surface of the recording medium, and the ink droplets not necessary for recording travel to a gutter and are collected. In many cases, the ink droplet deflecting means operates in conjunction with means which applies to the droplets an electric charge according to the desired amount of deflection for the droplet and the charged ink droplets then are caused to travel through a constant electrostatic field. The accurate control of deflection with such a system, however, depends greatly on the regular production of the ink droplets since this is critical to proper charging of the droplets. It is well known that, for this purpose, the mechanical vibration of a specified frequency is applied to the ink to control production of the droplets. In order to apply mechanical vibration to the ink, there are generally two measures adopted. According to one of them, a piezoelectric transducer is provided so as to surround the nozzle body of the recording head assembly coaxially. Such a nozzle is disclosed in U.S. Pat. No. 3,683,396 to Keur et al. U.S. Pat. No. 3,708,118 to Keur, or U.S. patent application Ser. No. 746,157, filed Nov. 30, 1976, assigned to Hitachi Ltd., assignee of the present application. In the ink jet recording apparatus using such a nozzle, the nozzle becomes large in size, and therefore, the responsiveness or controllability is not good. On the other hand, it is difficult to realize a recording head assembly of small size. The other measure adopted such apparatus is a nozzle in which the ion drag pump effect is utilized. Such a nozzle is described in e.g. The Review of Scientific Instruments, Vol. 39, No. 8 PP 1088–1089, in an article entitled "Production of Uniform Droplets by Means of an Ion Drag Pump". The present invention relates to an improvement of the recording head assembly of this type.

THE BRIEF DESCRIPTION OF THE DRAWINGS

SUMMARY OF THE INVENTION

An object of the present invention is to provide a recording head assembly of small size which is suitable for use in an ink jet recorder of the multinozzle type.

Another object of the present invention is to provide an ink jet recorder in which a recording head assembly of small size is used, so that the recorder has a high responsiveness and controllability.

The above objects can be accomplished by a recording head assembly which comprises an ink reservoir member made an electrical insulator having an inlet for supply of pressurized ink at one end thereof, at least one outlet opening in the end wall at the other end of the reservoir and at least a pair of electrodes, one of which is attached to the end wall of the reservoir around the inlet opening within the ink reservoir member and the other of which is fixed to the wall end on the side opposite to the one electrode and having an orifice aligned with the outlet opening.

Other objects and features of the present invention will become clear from the following description.

DETAILED DESCRIPTION OF A PREFERRED EMBODIMENT

Figure 1:
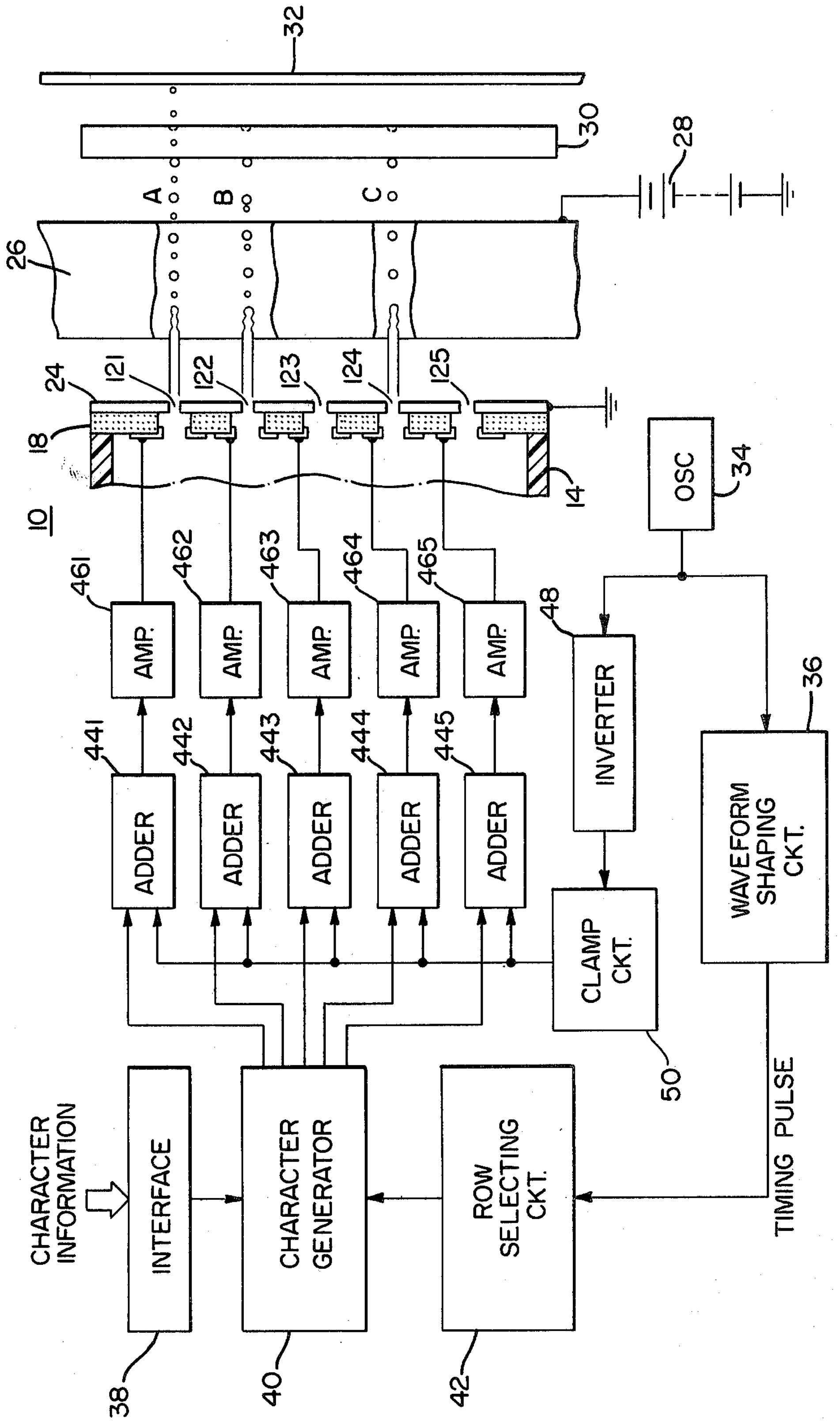
FIG. 1 is a schematic block diagram showing an ink jet recorder in accordance with an embodiment of the present invention.
Figure 2:
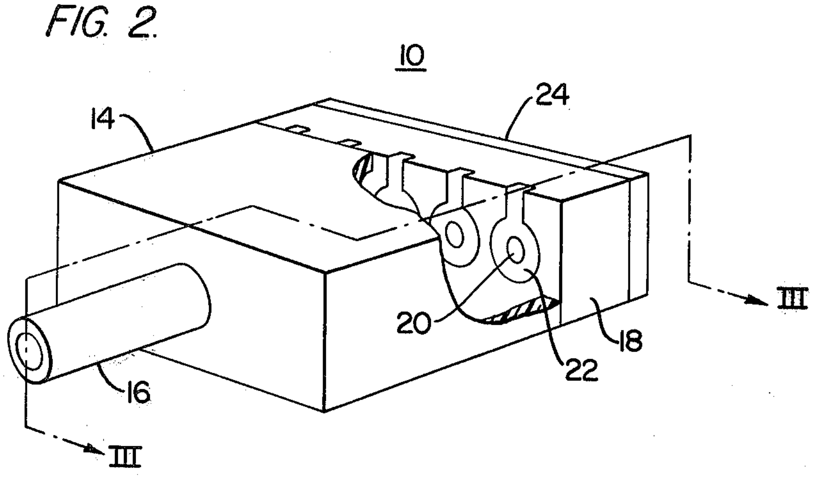
FIG. 2 is a partially sectional sketch showing a recording head assembly for use in the embodiment of FIG. 1.
Figure 3:
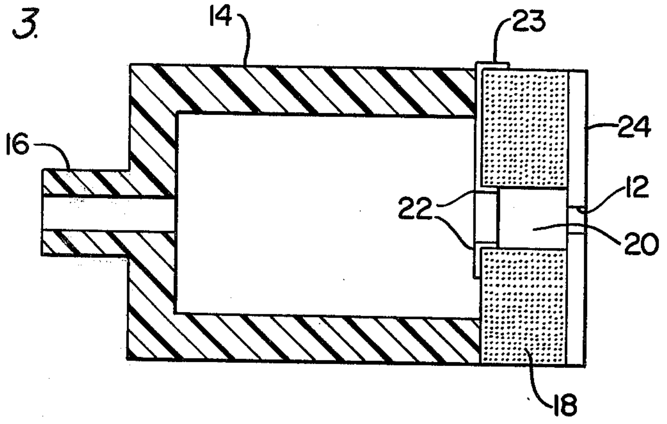
FIG. 3 is a sectional view of the recording head assembly taken along line III—III in FIG. 2.

Referring at first to FIG. 1, an explanation will be made of an ink jet recorder of the so-called multinozzle type in accordance with an embodiment of the present invention. In the recorder of this type, as is well known, one character or numeral to be printed is indicated by e.g. a dot matrix of 7 rows, 5 columns, and ink droplets are deposited on at least some matrix elements of one row at the same time. A recording head assembly 10 for use in such a recorder has a plurality of orifices each serving as a nozzle, from each of which ink is ejected; five orifices 121 to 125 in this case. In FIG. 1, however, there are shown representatively three ink jets A, B and C which are ejected from the orifices 121, 122 and 124. The structure of the recording head assembly 10 is shown in FIGS. 2 and 3 in detail. FIG. 2 shows a partially sectional sketch of the assembly 10 and FIG. 3 is a sectional view along the line III—III in FIG. 2. In these figures, a hollow member 14 of resin has an inlet 16 at one of its ends. The other end thereof is closed by an end plate 18 made of an electrical insulator, such as ceramic. The hollow member forms an ink reservoir in cooperation with the end plate 18. Ink under pressure is supplied through the inlet 16 into the ink reservoir. The end plate 18 has openings, which are generally indicated by reference numeral 20. On the inside of each opening 20 an inner electrode 22 is provided by metalizing, such as metal coating or vacuum evaporation, or by sticking a thin metal plate thereon. A part of the inner electrode 22 passes to the outside of the ink reservoir to serve as a terminal 23. A metal plate 24 is fixed to the end plate 18 on the opposite side to the inner electrode 22. The metal plate 24 has the orifices, which, in FIG. 3, are generally indicated by reference numeral 12. The metal plate 24 also operates as an outer electrode. The orifices 12, which can be formed by etching, are aligned with the corresponding openings 20, but the diameter of the former is much smaller than that of the latter. Accordingly, there exists a limited space surrounded by the inside wall of each opening 20 and the outer electrode 24. If a vibratory voltage having a fixed frequency and a certain magnitude is applied across the inner electrode 22 and the outer electrode 24, an electric field is applied to the ink existing within the limited space so that mechanical vibration occurs therein. For the purpose of the effective application of an electric field to the ink, it is very useful to face a part of the inner electrode 22 toward the outer electrode 24 or, as shown in FIG. 3, to extend a part of the inner electrode 22 toward the outer electrode 24 along the inside wall of the opening 20. The mechanical vibration is transmitted to the foremost portion of the ink stream which is ejected from the orifice 12. The magnitude of the vibration is proportional to that of the vibratory voltage applied across both electrodes 22 and 24. Further, as will be understood from the article in The Review of Scientific Instruments cited above, if the magnitude of the vibratory voltage is selected at a certain value, ink droplets of small diameter and ink droplets of large diameter will separate from the tip of the ink stream alternately, and the relative travelling speed between the small droplet and the large one depends on the magnitude of the applied vibratory voltage.

Figure 4:
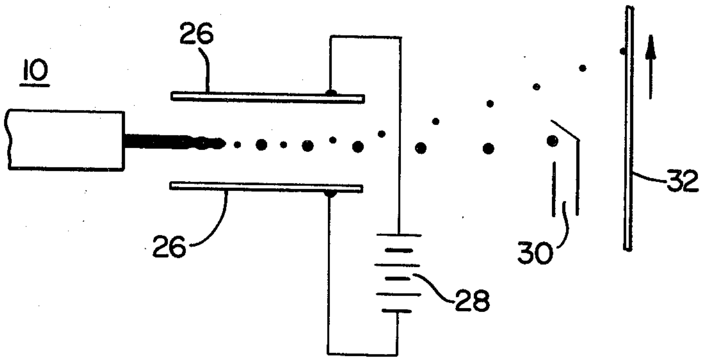
FIG. 4 is a diagram which aides in the general explanation of the travel of ink droplets in the ink jet recorder.

Looking to FIG. 1, there is provided a charging and deflecting electrode 26 near the recording head assembly 10. The electrode 26 is shown in a partially sectional view in order to illustrate the ink jets clearly. To the electrode 26, a high d.c. voltage of 500~4,000 volts is applied by a d.c. voltage source 28. The value of this d.c. voltage can be selected beyond the above specified range. Namely, as is well known, the value of the d.c. voltage is determined in consideration of the dimension of the charging and deflecting electrode, the size and travelling speed of the ink droplet and the necessary amount of deflection. In this embodiment, the electrode 26 is used in common for charging and deflecting the ink droplets. It is of course possible that two electrodes can be provided for the respective purposes, i.e. charging and deflecting. Next to the charging and deflecting electrode 26 a gutter 30 is positioned, which collects the ink droplets not necessary to the record. Reference numeral 32 represents a recording medium, such as paper. The recording medium 32 is driven by a proper driving mechanism (not shown) at a constant speed in a direction perpendicular to the surface of the drawing. On the other hand, it is also possible that the recording medium 32 is fixed and the recording head assembly 10 is moved. In FIG. 4 there is shown a side view of the positional relationship of the members described above and the travelling trace of the ink droplets. As is shown in this figure, since the tip portion of ink stream is coupled electrostatically with the charging and deflecting electrode 26, the electric charge induced in the ink concentrates at its tip. If, under such condition, the droplet is separated from the ink stream, the charge is enclosed into the separated droplet. The amount of the enclosed charge is almost proportional to the diameter of the separated droplet. On the other hand, the weight of the separated droplet is in proportion to the third power of the diameter thereof. The amount of deflection, therefore, is almost inversely proportional to the square of the diameter of the separated droplet. Then, the actual ratio of diameter of the large ink droplet to that of the small one is 3:1, and therefore, the ratio of amount of deflection becomes 1:9. As is shown in FIG. 4, therefore, the small ink droplet is deflected much more than the large one. If the gutter 30 is positioned so as to collect the large ink droplets, only the small ink droplets reach the surface of the recording medium 32, so that the recording is done by the small ink droplets. This is suitable for the recording of fine characters. Further, if the gutter 30 is positioned so as to interrupt the travelling of the small ink droplets, the recording can be made by only the large ink droplets. This fits the recording of thick characters.

The recording head assembly 10 described above, as shown in FIG. 1, is excited by an electric circuit which comprises a character signal generating unit, a signal modification and amplification unit and a timing pulse unit. The timing pulse unit includes a high frequency oscillator 34 and a waveform shaping circuit 36 and supplies timing pulses for the character signal generating unit and the signal modification and amplification unit. The character signal generating unit is formed by an interface 38, a character generator 40 and a row selecting circuit 42. The character information, which may be the typical output of an electronic computer or facsimile telegraph receiver is applied to the character generator 40 through the interface 38. Signals corresponding to all columns of a certain row which is designated by the row selecting circuit 42 are read out simultaneously from the character generator 40 in response to the timing pulse. The signals read out are sent to the signal modification and amplification unit all at once. The signal modification and amplification unit includes a plurality of adders 441 to 445 and amplifiers 461 to 465 connected to the respective adders 441 to 445. The number of the adders and amplifiers provided corresponds to the number of the orifices 121 to 125, i.e. the inner electrodes 22 provided in the recording head assembly 10. The signals from the character generator 40 are applied to the corresponding adders 441 to 445 as one of two input signals thereof. The signal modification and amplification unit further comprises an inverter 48 and a clamp circuit 50. The pulse train which is obtained from the oscillator 34 through the inverter 48 and the clamp circuit 50 is applied to the adders 441 to 445 as the other input signal thereof. The output from the clamp circuit has the same frequency as the timing pulses from the waveform shaping circuit 36, but is different in phase by 180° therefrom. The sums of the two input signals are amplified in the respective amplifiers 461 to 465 and applied to the inner electrodes 22 of the orifices 121 to 125 as an exciting voltage.

Figure 5:
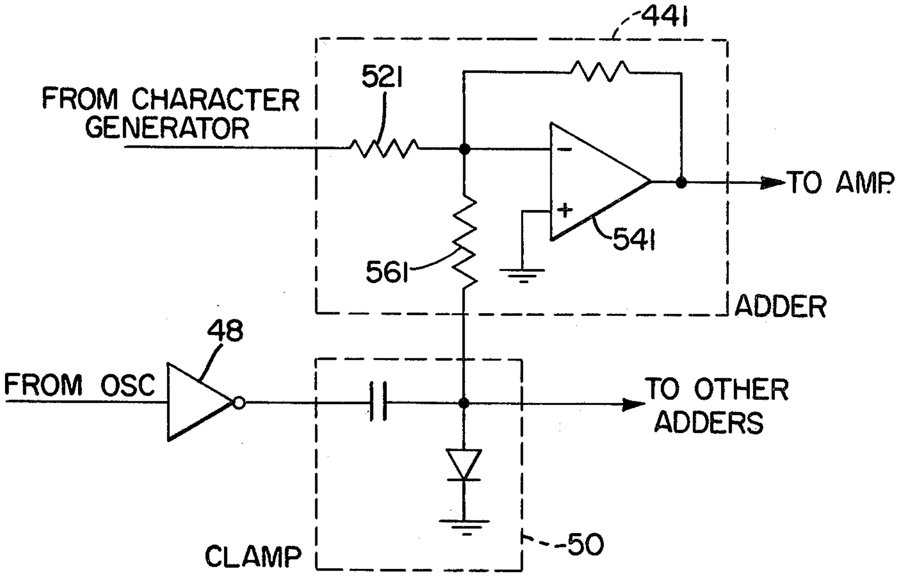
FIG. 5 is a schematic diagram of a part of the circuit arrangement used in the embodiment of FIG. 1.
Figure 6:
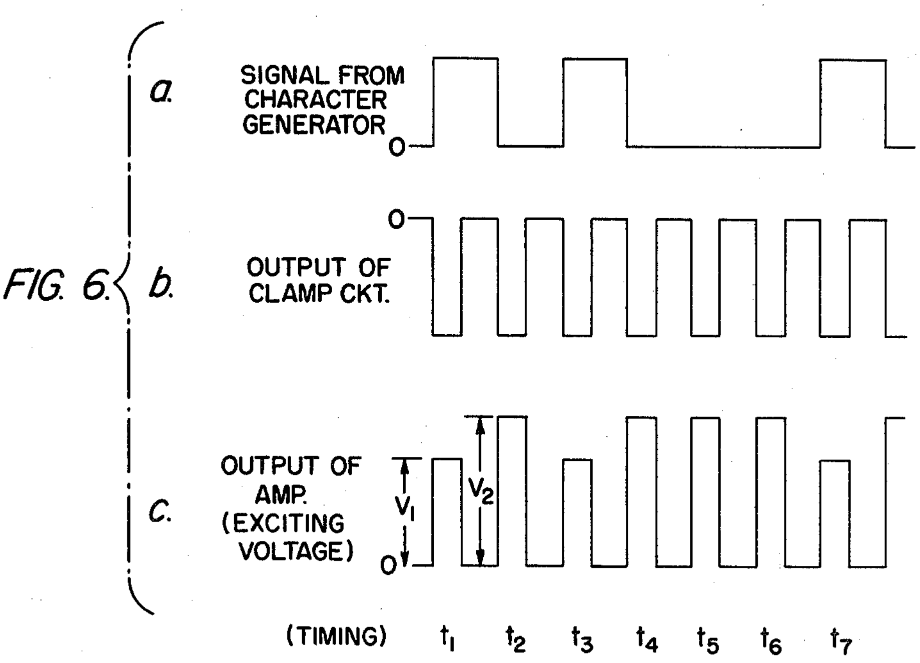
FIGS. 6(*a*) to 6(*c*) are waveform diagrams show the relationship between waveforms of various parts of the circuit and recording timing for the purpose of the explanation of the operation of the circuit shown in FIG. 5.

Referring to FIGS. 5 and 6, an explanation will be provided of the details of a part of the signal modification and amplification unit and the operation thereof. In FIG. 5 only one of the adders is indicated in detail representatively. This adder 441 controls the excitation of the inner electrode of the orifice 121. The signal for the orifice 121 which is read out from the character generator 40 is applied through an input resistor 521 to a minus terminal of an operational amplifier 541, the plus terminal of which is grounded. This signal is as shown in FIG. 6(*a*). Namely there are recording signals at timings $t_1$, $t_3$ and $t_7$. This fact means that ink droplets should be deposited as matrix dots in the first, the third and the seventh rows of the first column. On the other hand, the polarity of the output pulses from the oscillator 34 is reversed by the inverter 48 and the waveform thereof is shaped by the clamp circuit 50, so that the pulse train as shown in FIG. 6(*b*) is applied to the minus terminal of the operational amplifier 541 through another input resistor 561. The output pulses of the clamp circuit 50 are also applied to input resistors 562 and 565

(not shown) of the adders 442 to 445. In the adder 441 the signal shown in FIG. 6(*a*) and the output pulses shown in FIG. 6(*b*) are added, so that the sum thereof is applied to the amplifier 461 (FIG. 1). Accordingly, the output voltage as shown in FIG. 6(*c*) is obtained from the amplifier 461 as an exciting voltage for the inner electrode with which the orifice 121 is associated. Then, the value $V_1$ or $V_2$ of the exciting voltage must be selected as follows. When the inner electrode of the orifice 121 is excited by the voltage $V_1$, the relative travelling speed between the large ink droplet and the small one is zero so that both droplets travel at the same speed. This condition is shown by the ink jet A in FIG. 1. In case the inner electrode of the orifice 121 is excited by the voltage $V_2$, there must be the speed difference between the large ink droplet and the small one so that as small ink droplet is combined into either the proceeding large ink droplet or the succeeding one before the small ink droplet comes near the gutter 30 (see the ink jet B in FIG. 1), or the generation of the small ink droplets must be suppressed completely, as shown by the ink jet C in FIG. 1.

I claim:

1. A recording head assembly for ink jet recorders comprising:

a hollow member having an inlet opening for supply of pressurized ink at one end thereof;

and end plate made of an electrical insulator having at least one outlet opening and being attached to the other end of the hollow member as an end wall thereof to form an ink reservoir in cooperation with the hollow member;

at least one inner electrode disposed on the end plate around said outlet opening on the inside of the ink reservoir;

at least one outer electrode attached to the end plate on the outside of the ink reservoir and having an orifice aligned with said outlet opening, said at least one inner electrode and said at least one outer electrode being arranged for receiving an electric signal indicative of character information applied therebetween.

2. A recording head assembly according to claim 1, wherein at least a part of the inner electrode is extended toward the outer electrode along the inside wall of the outlet opening.

3. A recording head assembly according to claim 1, wherein the diameter of the orifice of the outer electrode is smaller than that of the outlet opening of the end plate.

4. A recording head assembly according to claim 1, wherein the end plate is provided with at least two outlet openings, at least two inner electrodes are disposed in an electrically insulated manner from each other on the end plate around the outlet openings on the inside of the ink reservoir, and respective inner electrodes and said at least one outer electrode are arranged for receiving electrical signals indicative of character information applied individually therebetween.

5. An ink jet recorder comprising:

a recording head assembly having an ink reservoir member made of an electrical insulator which has an inlet opening for supply of pressurized ink at one end thereof and an outlet opening in the wall at the other end and two electrodes, one of which is attached to the wall around the outlet opening within the ink reservoir member and the other electrode of which is fixed to the wall on the side opposite to the one electrode and has an orifice aligned with the outlet opening;

means for applying a vibratory voltage modified in accordance with a given external input signal indicative of character information between both of the electrodes; and means for deflecting ink droplets ejected from the recording head assembly.

6. An ink jet recorder according to claim 5, wherein at least a part of the one electrode is extended toward the other electrode along the inside wall of the opening.

7. An ink jet recorder according to claim 5, wherein the diameter of the orifice of the other electrode is smaller than that of the opening.

8. An ink jet recorder comprising:

a recording head assembly having an ink reservoir member made of an electrical insulator which has an inlet for supply of pressurized ink at one end thereof and a plurality of outlet openings at the other end thereof, a plurality of inner electrodes attached to the said other end around the openings within the ink reservoir member, and a plurality of outer electrodes fixed to the said other end on the outside of the reservoir member opposite to the inner electrodes to form a plurality of pairs of electrodes, each outer electrode having an orifice aligned with the corresponding outlet opening;

means for receiving a given external input signal thereby to generate character signals for the respective pairs of electrodes simultaneously;

means for applying vibratory voltages modified in accordance with the respective character signals to the respective pairs of electrodes individually; and means for deflecting ink droplets ejected from the recording head assembly.

9. An ink jet recorder according to claim 8, wherein at least a part of each of the inner electrodes is extended toward the outer electrode along the inside wall of the corresponding opening.

10. An ink jet recorder according to claim 8, wherein the diameter of the orifice of each of the outer electrodes is smaller than that of the corresponding one of the openings.

11. A ink jet recorder according to claim 8, wherein a sheet of electrically conducting material which has a plurality of orifices aligned with the corresponding openings is utilized for a common outer electrode.

12. An ink jet recorder according to claim 11, wherein the diameter of each of the orifices is smaller than that of the corresponding one of the openings.

13. An ink jet recorder comprising:

a recording head assembly having an ink reservoir member made of an electrical insulator which has an inlet opening for supply of pressurized ink at one end thereof and at least one outlet opening in the wall at the other end, at least one first electrode attached to the wall around the at least one outlet opening within the ink reservoir member, and at least one second electrode fixed to the wall on the side opposite to the at least one first electrode and having at least one orifice aligned with the at least one outlet opening;

means for applying a vibratory voltage modified in accordance with a given input signal indicative of character information between said at least one first electrode and said at least one second electrode.

14. An ink jet recorder according to claim 13, wherein the wall at the other end is provided with a plurality of outlet openings, a plurality of first electrodes are provided and are mounted in an electrically insulated manner from each other on the wall around the plurality of outlet openings within the ink reservoir member, said second electrode having a plurality of orifices aligned with the plurality of outlet openings respectively, and said applying means applying the vibratory voltage modified in accordance with the given input signal indicative of character information between each of said first electrodes and said second electrode.

15. An ink jet recorder according to claim 14, further comprising means for deflecting ink droplets ejected from the recording head assembly.

16. An ink jet recorder according to claim 15, wherein at least a part of each of said first electrodes is extended toward said second electrode along the inside wall of the corresponding opening.

17. An ink jet recorder according to claim 16, wherein the diameter of each orifice of the at least one second electrode is smaller than that of the corresponding one of the outlet openings.

* * * * *